United States Patent [19]

Yoshiike et al.

[11] 4,250,381
[45] Feb. 10, 1981

[54] LINEAR SCALE TYPE MEASURING DEVICE

[75] Inventors: Katsushi Yoshiike; Toru Igarashi, both of Tochigi; Yasuyuki Yamaryo, Kanagawa, all of Japan

[73] Assignee: Mitutoyo Mfg., Co., Ltd., Tokyo, Japan

[21] Appl. No.: 57,556

[22] Filed: Jul. 16, 1979

[30] Foreign Application Priority Data

Jul. 31, 1978 [JP] Japan ............................ 53-105816[U]

[51] Int. Cl.³ ............................................ G01B 11/04
[52] U.S. Cl. ............................... 250/237 G; 33/125 C; 356/395
[58] Field of Search ................. 33/125 A, 125 C, 1 L; 250/237 G; 403/329; 356/395

[56] References Cited

U.S. PATENT DOCUMENTS

| Re. 29,281 | 6/1977 | Burns et al. ............... 250/237 G X |
|---|---|---|
| 2,455,765 | 12/1948 | Harvey ...................... 403/329 X |
| 2,673,468 | 3/1954 | Immel et al. ................ 74/470 X |
| 2,886,717 | 5/1959 | Williamson et al. ......... 250/237 G |
| 3,328,109 | 6/1967 | Seedhouse ................... 350/86 X |
| 3,864,050 | 2/1975 | Thomas ....................... 403/329 |
| 3,899,255 | 8/1975 | Meier ......................... 33/125 A X |
| 4,031,595 | 6/1977 | Welker ....................... 250/237 G X |
| 4,063,086 | 12/1977 | Hirose ........................ 250/237 G |
| 4,095,903 | 6/1978 | Feichtinger ................. 356/395 |

Primary Examiner—Daniel M. Yasich
Attorney, Agent, or Firm—Koda and Androlia

[57] ABSTRACT

A linear scale type measuring device wherein an index scale mounted on a slider is opposed to a linear scale, the displacement of a movable member is imparted to said slider through connecting means and the relative displacement between the linear scale and the index scale is read by use of a light source and a receptor element both of which are provided on the slider, characterized in that said connecting means comprises a first engageable member provided at the forward end of a cantilever spring for biasing the slider toward the linear scale and a second engageable member engaging said first engageable member, and one of said first and second engageable members is formed into a projection or a recess provided with a tapered surface and the other is formed into a hole engageable with the tapered surface of said projection or cornered portion engageable with the tapered surface of said recess, said hole or the cornered portion being made of a ring-like portion which the forward portion of said cantilever spring is bent into.

1 Claim, 10 Drawing Figures

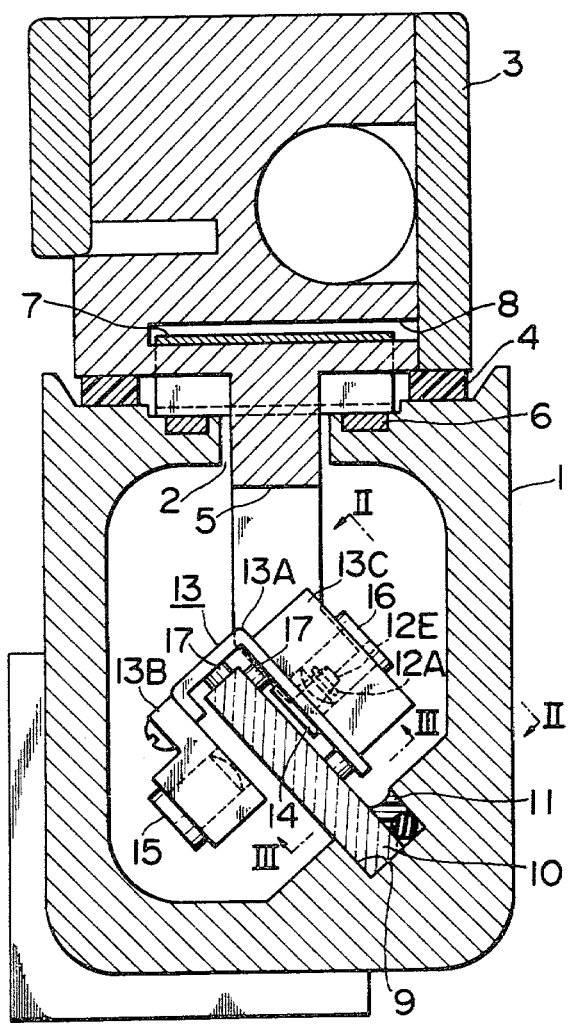
FIG_1

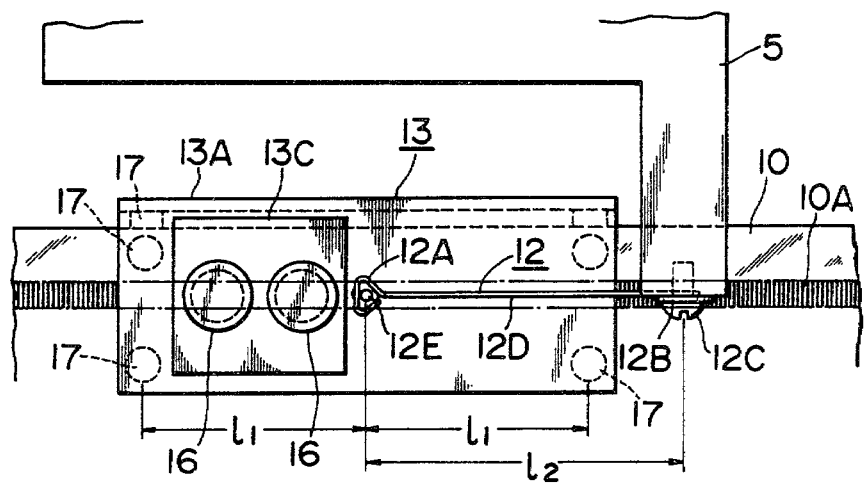
FIG_2
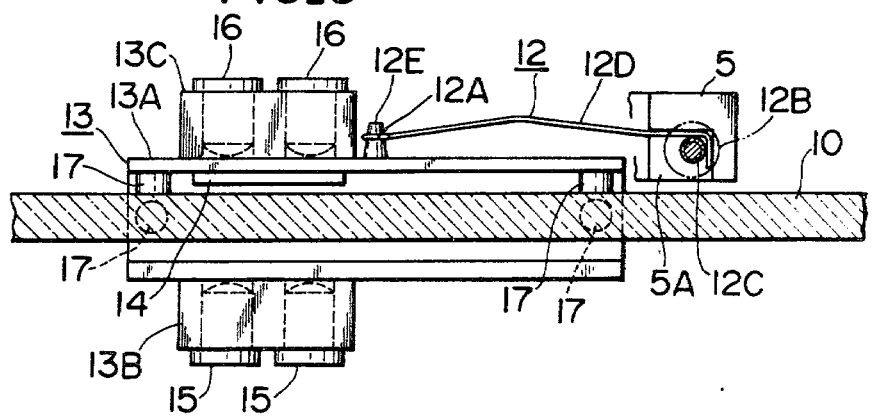
FIG_3

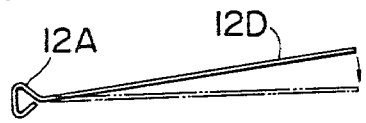
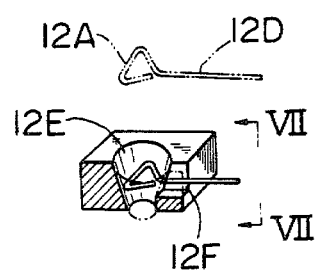
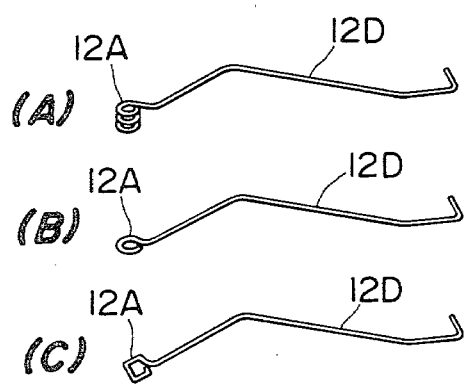
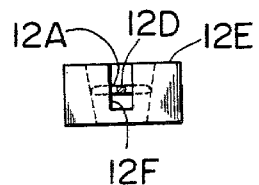
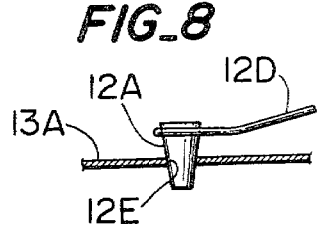

LINEAR SCALE TYPE MEASURING DEVICE

BACKGROUND OF THE INVENTION

1. Field of the Invention

The present invention relates to a linear scale type measuring device in which the relative displacement between a light transmitting linear scale and an index scale relatively opposed to said linear scale is read by use of a light source and a receptor element so as to make measurement.

2. Prior Art

The conventional measuring device of the type described has been such an arrangement that a linear scale made of glass and formed by cold drawing is disposed in a hollow and elongate case in the longitudinal direction, an index scale is disposed in opposed relation to the linear scale, said index scale is mounted through a slider on an arm of a detecting mechanism which is a movable member inserted through an opening formed in the longitudinal direction of said case, a projector element as a light source and a receptor element are provided on said slider, and the relative displacement between the detecting mechanism and the case is detected and measured by the receptor element as the light and darkness formed between the both scales. Additionally, said slider is solidly secured through a screw, etc. to the center portion of a formed wire whose opposite ends are supported by the arm of the detecting mechanism, biased to one side by said formed wire, and probes provided on said slider are brought into abutment with the scale surface of the linear scale and the side surfaces perpendicularly intersecting the scale surface. With this arrangement, the slider is moved under the guidance of the scale surface of the linear scale and said side surfaces, and the scale portion of the linear scale and the scale portion of the index scale are adapted to move in opposed relation to each other.

One such prior art device described above is described in the U.S. Pat. No. 3,833,303.

However, in the conventional linear scale type measuring device as described above, the force keeping the linear scale and the slider having the index scale in pressing contact is provided by a single formed wire supported at opposite ends thereof, and hence, the formed wire is deformed when the slider is moved, the resultant change in the pressingly contacting force may cause one side of the slider to be lifted up relative to the linear scale. If the abutment between the linear scale and the slider becomes unreliable, then the longitudinally striped graduation lines of the linear scale and the longitudinally striped graduation lines of the index scale mounted on the slider come out of parallel, thus resulting in miscount.

SUMMARY OF THE INVENTION

One object of the present invention is to provide a linear scale type measuring device wherein a fixed case has a linear scale provided therein and coupled thereto a slider which is slidably provided in the case, an index scale mounted on said slider is opposed to linear scale, when the slider and the linear scale move relative to each other, the slider and the linear scale abut against each other under a uniform pressing contact force, thus avoiding miscount.

According to the present invention, in imparting the displacement of the movable member to the slider, as the connecting means to be provided between the slider and the arm of the detecting mechanism which is the movable member, there are used the first engageable member provided at the forward end of the cantilever spring for biasing the slider toward the linear scale and the second engageable member engageable with said first engageable member, and said first engageable member comprises a triangular shaped ring formed in said forward end of said cantilever spring and said second engageable member comprises a frustoconical projection provided on said slider, thereby achieving the aforesaid object.

DESCRIPTION OF THE ATTACHED DRAWINGS

FIG. 1 is a cross-sectional view showing one embodiment of the linear scale type measuring device according to the present invention;

FIG. 2 is a cross-sectional view taken along the line II—II in FIG. 1;

FIG. 3 is a cross-sectional view taken along the line III—III in FIG. 1;

FIG. 4 is a plan view showing the cantilever spring in free condition;

FIGS. 5(A), 5(B) and 5(C) are oblique views showing other embodiments different from one another of the first engageable member used in the present invention;

FIG. 6 is a oblique half-sectional view showing another embodiment of the second engageable member;

FIG. 7 is a cross-sectional view taken along the line VII—VII in FIG. 6; and

FIG. 8 is a cross-sectional view showing further embodiments of the first and second engageable members.

DESCRIPTION OF THE PREFERRED EMBODIMENTS

Description will hereunder be given of a first embodiment of the present invention with reference to FIGS. 1 through 4.

A case 1 formed by cold drawing has a substantially square hollow section, formed into an elongate shape in the direction perpendicularly intersecting the surface of paper in FIG. 1, and has an opening 2 for substantially the whole length along one side surface in the longitudinal direction.

A detecting mechanism 3 which is a movable member abuts against the end face of said case 1 on the opening side through a slidable member 4, and adapted to be movable in the longitudinal direction of the case 1. An arm 5 formed on the undersurface of said detecting mechanism 3 extends from said opening 2 into the case 1. Furthermore, a pair of magnets 6 are provided on the outer surface of the case 1 at a portion adjacent said opening 2, and a blocking member 7 made of a thin iron plate is attracted to the magnets 6 in a manner to cover said opening 2, thereby preventing dust and the like from entering into the case 1 through said opening 2. In this case, the portion of the blocking member 7 where an arm 5 of the detecting mechanism 3 is inserted into a groove 8 having a convex shape in section, provided in said detecting mechanism 3 and having opposite openings at the undersurface of said detecting mechanism 3, so that the arm 5, over which said groove 8 extends, can be inserted into the case 1. In use, the detector 3 and casing 1 are coupled to two relatively movable members using bolts or the like.

In the case 1 there is provided a groove 9 which extends in the longitudinal direction thereof. The linear scale 10 is made of glass and is formed with longitudinally striped graduation lines 10A (refer to FIG. 2) at one side thereof. The lower end portion of said linear scale 10 is inserted into the groove 9 and solidly secured by an adhesive 11 and the like.

The arm 5 of said detecting mechanism 3 is extended to a portion adjacent said linear scale 10, and a slider 13 is movably mounted at the forward end portion of said arm 5 through connecting means 12. Said connecting means comprises a linear cantilever spring 12D integrally formed at the forward end thereof with a first engageable member 12A and secured at the proximal end thereof to the arm 5 through a washer 12B and a screw 12C, and a second engageable member 12E engageable with said first engageable member 12A. The forward end of the cantilever spring 12D is formed into a triangle so as to form said first engageable member 12A, and the second engageable member 12E is formed into a frustoconical projection having a tapered surface to be coupled in a hole formed within the triangle of the first engageable member 12A by loosely fitting the first engageable member 12A into the second engageable member 12B. Futhermore, as shown in FIG. 3, the intermediate portion of the cantilever spring 12D is bent into a chevron shape to urge the slider 13 toward the surface of the linear scale 10 where graduation lines 10A are provided (hereinafter referred to as the "graduation surface"), and as shown in FIG. 4, the cantilever spring 12D, when in free condition, is bent at the root of the first engageable member 12A in a manner that the proximal end of the cantilever spring 12D is disposed higher than the horizontal position as indicated by the full lines. When the cantilever spring 12D is installed, the slider 13 is adapted to be urged toward side surfaces perpendicularly intersecting the graduation surface of the linear scale 10. Further, the cantilever spring 12D, in its condition of being mounted on the arm 5, is adapted to be disposed at the center in the widthwise direction of the graduation lines 10A of the linear scale 10 (Refer to FIG. 2), and a straight line the engaging portion between the second engageable member 12E having the tapered surface and the first engageable member 12A to the mounting portion of the arm 5 is adapted to be parallel with the graduation surface of the linear scale 10 (Refer to FIG. 3). In addition, the proximal bending portion of the cantilever spring 12D is snugly fitted into an inner corner portion of a rectangular recess 5A cut away from one corner at the forward end of the arm 5. Said slider 13 comprises a probe mount member 13A formed from a plate into a substantially letter 'L' shape, a projector mount member 13B of thick wall threadably coupled to a short bending side at one end of said probe mount member 13A and opposed to the surface of the linear scale 10 where no graduation lines are provided, and a receptor mount member 13C of thick wall (not shown) threadably coupled to a long bending side at the other end of said probe mount member 13A and opposed to the graduation surface of said linear scale 10. In this case, said second engaging member 12E is projectingly provided on the outer surface of the letter 'L' shaped long side of the probe mount member 13A disposed adjacent the linear scale 10, whereby the cantilever spring 12D is disposed relatively close to the linear scale 10. Fixed on the surface of the probe mount member 13A of said slider 13 which is opposed to the graduation surface of the linear scale 10 is an index scale 14 having longitudinally striped graduation lines (not shown) similar to that of the linear scale 10. A projector element 15 and a receptor element 16 are disposed in a manner to hold the index scale 14 and the linear scale 10 therebetween. In this case, two of the projector elements 15 and fixed on the projector mount member 13B secured to the letter 'L' shaped short side of said probe mount member 13A, and two of the receptor elements 16 are fixed on the receptor element mount member 13C secured to the letter 'L' shaped long side of said probe mount member 13A.

Fixed on the inner surface of the letter 'L' shaped of said probe mount member 13A, i.e. the graduation surface of said linear scale 10 and the surfaces opposed to the side surfaces perpendicularly intersecting said graduation surface are pluralities of sliders 17, respectively, which are made of resins having low coefficient of friction such as polyacetal resins. Said sliders 17 are adapted to be abutted by the biasing force of said cantilever spring 12D against the graduation surface of the linear scale 10 and the side surfaces perpendicularly intersecting said graduation surface. Further, said sliders 17 are disposed $2l_1$ apart from each other in the longitudinal direction of the linear scale 10 (Refer to FIG. 2), and said second engageable member 12E is disposed at the position intermediate of the sliders 17 at the opposite ends in the longitudinal direction of the linear scale 10, i.e. at the position a distance $l_1$ apart from the sliders 17, respectively. Further, the distance between the center of the second engageable member 12E and the center of the screw 12C for mounting the proximal end of the cantilever spring 12D on the arm 5 is $l_2$.

With the above arrangement, either one of the case 1 or the detecting mechanism 3 being the movable member is mounted on an article to be measured, and the other is fixed. Then, if the article to be measured is moved, light and dark stripe patterns are produced between the graduation lines 10A of the linear scale 10 and the graduation lines of the index scale 14. Said stripe patterns are read by the projector element 15 and the receptor element 16, whereby the displacement of the article under measurement is read, thereby performing the measurement. In this case, the slider 13 is urged at the central portion in the longitudinal direction thereof by the cantilever spring 12D and the first engageable member 12A and the second engageable member 12E fixed on the probe mount member 13A of the slider 13 are abutted against each other in a manner the tapered projection and the triangle portion come into contact at three points, and hence, the probes 17 of the slider 13 and the linear scale 10 can move while being in stable pressure contact with each other.

As described above, in the present embodiment, the probes 17 of the slider 13 and the linear scale 10 can be slided in stable and close contact with each other without being floated up, and hence, such miscount can be prevented as to be resultant from the relative inclination between the graduation lines 10A of the linear scale 10 and the graduation lines of the index scale 14. Futhermore, since the center line of the graduation lines of the linear scale 10 in the widthwise direction and the cantilever spring 12D of the connecting means 12 are incorporated in a straight line (Refer to FIG. 2), resultant measurement errors can be minimized by the theory of Abbe (The theory to the effect that the more closely the graduation portion and the article to be measured are incorporated in a straight line, the less the resultant measurement errors become). In this case, since the second engageable member 12E is mounted on the probe mount member 13A disposed adjacent the linear scale 10 in FIG. 3, the point at which the moving force of the article to be measured acts on the slider 13, i.e. the abutment between the first and second engageable members 12A and 12E can be brought relatively close to the linear scale 10. As viewed from this point, it meets the theory of Abbe and further the point on which the force acts is positioned low, and hence, the turning moment when the slider 13 moves can be minimized, thereby enabling to smooth the movement. Further, since the first and second engageable members 12A and 12E are brought into contact at three points as described above, the slider 13 can be moved along any crookedness, warp or the like which the linear scale 10 might have, and moreover, any jolting motion which the slider might be encountered during its advance and return, thereby enabling to avoid resultant measurement errors which might occur during advance and return of said slider. Furthermore, since the first and second engageable members 12A and 12E are the portion of the cantilever 12D formed of a formed wire and a frustoconical base made of resin, respectively, they can be provided in simplified construction and inexpensive costs.

In addition, in the present embodiment, the longer the distance $l_2$ between the center of the second engaging member 12E and the center of the screw 12C is, the less the errors due to the deviations of the slider 13 become. However, a suitable arrangement may selected in connection with the dimensions of the measuring device on the whole.

Next, FIGS. 5(A), 5(B) and 5(C) show different embodiments of the first engageable member 12A integrally formed at the forward end of the cantilever spring 12D, in which:

FIG. 5(A) shows one formed into a helical shape;

FIG. 5(B) shows one formed into a single circle; and

FIG. 5(C) shows one formed into a square.

All of the above shapes yield substantially the same results as in the preceding embodiment.

FIGS. 6 and 7 show other embodiments of the second engageable member 12E. In the present embodiment, the second engageable member 12E, instead of being formed into a projection having a tapered surface, is formed into a recess having a tapered surface, into which the first engageable member 12A is inserted in a manner that the corners on the outer periphery of the first engageable member 12A are adapted to abut against the tapered surface of said recess. In this case, a cutaway portion 12F for receiving the cantilever spring 12D is provided in the second engageable member 12E in a manner to be communicated with said recess from one side surface of the second engageable member 12E.

In the present embodiment with the above arrangement, the results similar to that in the preceding embodiments can be obtained.

In addition, the shape of the first engageable member 12A in the embodiment shown in FIGS. 6 and 7 is not limited to one shown in FIGS. 1 to 4, but may be ones shown in FIGS. 5(A), 5(B) and 5(C).

Next, FIG. 8 shows a still further embodiment of the first and second engageable members 12A and 12E. In this embodiment, the first engageable member 12A is formed into a flusto-conical base mounted at the forward end of the cantilever spring 12D, and the second engageable member 12E is formed into a hole provided in the probe mount member 13A of the slider 13. In this case, the shape of the hole constituting the second engageable member 12E may be of any shapes including polygons, such as a triangle and square, a circle and an oval.

The present embodiment with the above arrangement gives the results equal to the preceding embodiments.

In passing, in practical use, the shapes of the first and second engageable member 12A and 12E are not limited to the shapes adopted in the preceding embodiments, can be of the mutually engageable shapes other than that in the preceding embodiments, and further, can be of such shapes that the first and second engageable members 12A and 12E change place with each other, i.e. one out of the first and second engageable members 12A and 12E is formed into a projection or a recess formed with a tapered surface and the other is formed into a hole engageable with the tapered surface of said projection or formed into a projection engageable with the tapered surface of said recess. In this case, either one of said members may be formed of a member other than the cantilever spring 12D. However, if either one has the shape of the cantilever 12E whose forward end is integrally formed with a ring or the like, the manufacturing costs can be reduced. In addition, the positions of the first and second engaging members are not limited to the portion of the probe mount member 13A of the slider 13, but may be at the forward end of the arm 5. In other words, the proximal portion of the cantilever spring 12D may be fixed on the probe mount member 13A and the second engageable member 12E engageable with the first engageable member 12A may be provided at the forward end of the arm 5. Further, the probes 17 are not limited to be made of resin, but may be formed of ball bearings. Furthermore, the probes 17 may be integrally formed on the slider 13.

As has been described above, according to the present invention, such advantage is attained as to provide a linear scale type measuring device wherein the slider is maintained in stable pressing contact with the linear scale and errors in measurement due to miscount is minimized.

What is claimed is:

1. A linear scale type measuring device wherein a fixed case has a linear scale provided therein and coupled thereto a slider which is slidably provided in the case, an index scale mounted on said slider is opposed to a linear scale, relative displacement of a movable member relative to said fixed case is imparted to said slider through connecting means and relative displacement between the linear scale and the index scale is read by use of a light source and a receptor both of which are provided on the slider in opposed relationship with the index and linear scales interposed therein between, characterized in that said connecting means comprises a first engageable member provided at the forward end of a cantilever spring for biasing the slider towards the linear scale and a second engageable member engageable with said first engageable member, and said first engageable member comprises a triangular shaped ring formed in said forward end of said cantilever spring and said second engageable member comprises a frustoconical projection provided on said slider.

* * * * *